(12) United States Patent
Tang et al.

(10) Patent No.: US 12,040,986 B2
(45) Date of Patent: Jul. 16, 2024

(54) SWITCH DEVICE, CONTROL DEVICE AND CORRESPONDING METHODS FOR ENHANCED SCHEDULABILITY AND THROUGHPUT ON A TSN NETWORK

(71) Applicant: Huawei Technologies Co., Ltd., Shenzhen (CN)

(72) Inventors: Siyu Tang, Munich (DE); Jiao Wang, Beijing (CN); Zdenek Hanzalek, Prague (CZ); Marek Vlk, Prague (CZ); Katerina Jaskova, Prague (CZ)

(73) Assignee: Huawei Technologies Co., Ltd., Shenzhen (CN)

( * ) Notice: Subject to any disclaimer, the term of this patent is extended or adjusted under 35 U.S.C. 154(b) by 343 days.

(21) Appl. No.: 17/488,005

(22) Filed: Sep. 28, 2021

(65) Prior Publication Data
US 2022/0021625 A1    Jan. 20, 2022

Related U.S. Application Data

(63) Continuation of application No. PCT/EP2019/058075, filed on Mar. 29, 2019.

(51) Int. Cl.
*H04L 47/28* (2022.01)
*H04L 47/2416* (2022.01)
(Continued)

(52) U.S. Cl.
CPC .......... *H04L 47/28* (2013.01); *H04L 47/2416* (2013.01); *H04L 47/2441* (2013.01); *H04L 47/562* (2013.01)

(58) Field of Classification Search
None
See application file for complete search history.

(56) References Cited

U.S. PATENT DOCUMENTS

| | | | |
|---|---|---|---|
| 7,936,770 B1* | 5/2011 | Frattura | H04L 47/6215 370/357 |
| 2009/0268612 A1* | 10/2009 | Felderman | H04L 47/266 370/230 |

(Continued)

FOREIGN PATENT DOCUMENTS

| | | |
|---|---|---|
| CN | 108282415 A | 7/2018 |
| CN | 108965171 A | 12/2018 |
| WO | 2017082779 A1 | 5/2017 |

OTHER PUBLICATIONS

Craciunas et al., "Scheduling Real-Time Communication in IEEE 802.1Qbv Time Sensitive Networks," Presented at the 24th International Conference on Real-Time Networks and Systems (RTNS), ACM, 2016, XP058300427, total 10 pages (2016).

(Continued)

*Primary Examiner* — Phirin Sam
(74) *Attorney, Agent, or Firm* — Leydig, Voit & Mayer, Ltd.

(57) ABSTRACT

A device and method for a switch to operate as an intermediate node in a Time Sensitive Network (TSN) are provided. The switch transmits a frame at a time if it is the right frame to be transmitted at the time according to a configuration stored by the switch. The switch does not transmit the frame at the time if it is not the right frame to be sent at the time according to the configuration. Further, a device and method for scheduling transmission of a data packet from a talker node to a listener node are provided, including sending a configuration to each switch of a subset of switches in the network comprising information on the flow and a timing when it is to be output from the switch.

20 Claims, 7 Drawing Sheets

(51) Int. Cl.
  *H04L 47/2441* (2022.01)
  *H04L 47/56* (2022.01)

(56) References Cited

U.S. PATENT DOCUMENTS

| | | | |
|---|---|---|---|
| 2017/0070439 A1 | 3/2017 | Craciunas et al. | |
| 2018/0237039 A1* | 8/2018 | Mong | B61L 23/005 |
| 2018/0302330 A1 | 10/2018 | Bush | |
| 2018/0376367 A1 | 12/2018 | Das et al. | |
| 2019/0340314 A1* | 11/2019 | Boesch | G06F 30/327 |
| 2020/0228454 A1* | 7/2020 | Bush | H04L 47/27 |
| 2020/0259896 A1* | 8/2020 | Sachs | H04J 3/0667 |
| 2023/0276512 A1* | 8/2023 | Talebi Fard | H04L 47/724 709/227 |

OTHER PUBLICATIONS

"IEEE Standard for Local and metropolitan area networks-Bridges and Bridged Networks, Amendment 25: Enhancements for Scheduled Traffic," IEEE Std 802.1Qbv™-2015, Sponsor LAN/MAN Standards Committee of the EEE Computer Society, total 57 pages (Approved Dec. 5, 2015).

Steiner et al., "TTEthernet Dataflow Concept," 2009 Eighth IEEE International Symposium on Network Computing and Applications, XP031500063, pp. 319-322 (2009).

"IEEE Standard for Local and metropolitan area networks-Bridges and Bridged Networks-Amendment 28: Per-Stream Filtering and Policing," IEEE Std 802.1Qci™-2017, Sponsor LAN/MAN Standards Committeeof the IEEE Computer Society, total 65 pages (Approved Feb. 14, 2017).

Dürr et al., "No-wait Packet Scheduling for IEEE Time-sensitive Networks (TSN)," in Proceedings of the 24th International Conference on Real-Time Networks and Systems, ACM, pp. 203-212 (2016).

Glover, "Tabu Search-Part I," ORSA Journal on computing, vol. 1, No. 3, pp. 190-206 (1989).

R. Macchiaroli et al., "Modelling and optimization of industrial manufacturing processes subject to No. wait constraints," International Journal of Production Research, vol. 37, No. 11, total 25 pages (1999).

* cited by examiner

SWITCH DEVICE, CONTROL DEVICE AND CORRESPONDING METHODS FOR ENHANCED SCHEDULABILITY AND THROUGHPUT ON A TSN NETWORK

CROSS-REFERENCE TO RELATED APPLICATIONS

This application is a continuation of International Application No. PCT/EP2019/058075, filed on Mar. 29, 2019, the disclosure of which is hereby incorporated by reference in its entirety.

TECHNICAL FIELD

Embodiments of the present disclosure relate to a method and device for scheduling transmission of data from a source to a destination via one or more intermediate nodes and a method and device for operating as an intermediate node in a network.

BACKGROUND

An industrial communications and control network is a system of interconnected equipment used to monitor and control physical equipment in industrial environments. The development of (digital) industrial communications system undergoes three generations, namely, fieldbus technologies, Ethernet-based solutions and IEEE 802.1 Time Sensitive Networking (TSN), an open standard to promote interoperability of Ethernet based solutions in industrial communications and control networks. One main feature of the IEEE 802.1 TSN standard is a time division multiplexing (TDM) approach to control opening and closing of gates, thus, providing possibilities to handle real-time and non-real-time traffic on the same link.

Configuring the schedules of the gates (i.e., time-aware queues) to achieve predefined end-to-end (E2E) network delay is not a trivial issue. The most commonly used approach (up to date) to configure a TSN network is to centralize the computation in a single entity, i.e., the CNC (centralized network controller). Once the computation is completed, the CNC uses remote management to configure TSN features (e.g., scheduled traffic and cyclic queuing and forwarding) in each switch (also called bridge, node, intermediate node or bridge node). The data stream is transmitted from a Talker End Station or source to a Listener End Station or destination via the switches, the first one, linked to the Talker End Station, being denoted as an edge device (node) and the other switches as core devices (nodes).

The TSN CNC configuration methodology works in the following way:

Step 1: The end station registers a joining flow to a Centralized User Configuration (CUC) module. The CUC notifies the Centralized Network Configuration (CNC) module about the associated parameters (network cycle time, latency, jitter requirements such as maximum jitter, etc.) of the joining flow.

Step 2: The CNC utilizes certain schemes to compute the configuration parameters (e.g., gate control list or gate open list for scheduled traffic, specifying which gate opens at which time instant within the network cycle).

Step 3: The CNC uses remote management to discover physical topology and retrieve Bridge capabilities, and distributes the computed parameters to each Ethernet switch. Due to the global time synchronization protocol implemented in a TSN network, an end station can start sending datagrams according to the computation in Step 2.

Selection of the scheme to compute the configuration for the switches as well as the corresponding switch capabilities has impact on the performance of the entire TSN network.

SUMMARY

Embodiments of the present invention provide apparatuses and methods for effectively routing time critical data traffic in a TSN such that the switches are used effectively. In particular, some embodiments may facilitate that congestion of the network is reduced.

The foregoing and other objects are achieved by the subject matter of the independent claims. Further implementation forms are apparent from the dependent claims, the description and the figures.

According to a first aspect, a switch device is provided for operating as an intermediate node in a Time Sensitive Network (TSN), comprising a storage unit storing a configuration indicating for a flow a timing in which a frame pertaining to the flow is to be output; and a processing circuitry configured to receive a frame pertaining to the flow, in a case where the frame is to be transmitted at a current time according to the configuration, transmit the frame at the current time, and, otherwise, do not transmit the frame at the current time. For example, the processing circuitry may be configured to check whether the frame is to be transmitted at the current time based on the configuration and to transmit the frame only in this case. A frame may be a periodically occurring instance of a flow. A switch device according to this aspect can improve determinism and fault tolerance in a TSN as the timing of each frame can be checked in each transmission from one network node to another. Furthermore, a switch device according to this aspect makes it possible for TSNs to be tolerant against frame losses without the need to use a Frame Isolation Constraint (FIC), in the scheduling.

According to a second aspect, the switch device according to the first aspect is provided, further comprising one or more input ports and one or more output ports and one or more queues, wherein the processing circuitry is further configured to store the frames being received by the one or more input ports into the one or more queues and transmit the frames via the one or more output ports according to the configuration. A switch device according to this aspect can improve the number of possibilities of how the network can be scheduled such that all frames are transmitted in time. Furthermore, the number of frames that can be transmitted per time can be increased.

According to a third aspect, a switch device according to the first or the second aspect is provided, further comprising an input for receiving the configuration to be stored in the storage unit from a Central Network Configuration (CNC), device. This can be a separate input port or an input port also used for receiving flows from source nodes to destination nodes. The processing circuitry may be configured to store the received configuration to the storage unit.

Reception of configuration from the CNC facilitates adaption of the TSN to various scenarios such as addition or removal of network nodes such as switched, source nodes, destination nodes, or flows. Such dynamic configuration may even be possible during operation of the network, thus enabling recovery from possible failures.

According to a fourth aspect, a switch device according to any of the first, second or third aspect is provided, further configured to receive a frame for which no timing is indicated in the configuration and to transmit the frame at a time where no frame specified in the configuration is to be transmitted according to the configuration. In this way, resources of the TSN may be efficiently exploited.

According to a fifth aspect, a control device is provided for scheduling a transmission of a flow from a source to a destination via one or more intermediate nodes in a Time Sensitive Network (TSN), the one or more intermediate nodes including a subset of intermediate nodes, wherein the device comprises a processing circuitry configured to calculate, for each intermediate node of the subset, a configuration indicating for the flow a timing in which a frame pertaining to the flow is to be output from the intermediate node, and to output (or transmit/provide) the configuration to the one or more intermediate nodes of the subset. The timing may be indicated implicitly, e.g. in terms of the durations of one or more preceding frames. Such control device facilitates increase of deterministic behavior of the TSN, which may contribute to safe and predictable operation of the entire network.

According to a sixth aspect, a control device according to the fifth aspect is provided, wherein configurations are calculated for a plurality of flows and chosen such that the least number of queues is used. In this way, the number of queues can be optimized, which facilitates efficient implementation of network nodes and usage of resources.

According to a seventh aspect, a control device according to the sixth aspect is provided, wherein the configurations are chosen such that a plurality of frames are not stored to the same queue in an intermediate node if they are scheduled to be transmitted in an order other than the order they are scheduled to be received by the intermediate node, and otherwise, configurations can be chosen such that the plurality of frames is stored to the same queue. This constrain may provide an efficient solution for the schedule in the network nodes, e.g. by not requiring FIC to hold.

According to an eighth aspect, a control device according to any of the fifth to seventh aspect is provided, wherein the processing circuitry is further configured to receive flow information comprising the source address and the destination address and the timing for the flow, and to calculate the configuration based on the received flow information.

According to a ninth aspect, a switch device according to any of the first to fourth aspect or a control device of any of the fifth to eighth aspect is provided, wherein the configuration comprises flow information identifying the flow by a source address and a destination address of the flow or by a value of a flow identifier.

According to a tenth aspect, a switch device according to any of the first to fourth aspect or a control device of any of the fifth to ninth aspect is provided, wherein the configuration comprises information in which queue the frame is stored and/or information specifying over which output port the frame is to be transmitted.

According to a eleventh aspect, a switch device according to any of the first to fourth aspect or a control device of any of the fifth to tenth aspect is provided, wherein the frame is a MAC frame including a source address and a destination address of the flow in MAC frame header. This enables utilization and enhancement of some existing network architectures.

According to a twelfth aspect, a switch device according to any of the first to fourth aspect or a control device of any of the fifth to eleventh aspect is provided, wherein the flow is a periodic data transmission from one end station of the TSN to another end station.

According to an aspect, a method is provided for operating an intermediate node in a Time Sensitive Network, TSN. The method comprises the steps of storing a configuration indicating for a flow a timing in which a frame pertaining to the flow is to be output; and receiving a frame pertaining to the flow. In a case where the frame is to be transmitted at a current time according to the configuration, the frame is transmitted at the current time, and, otherwise, not transmitted the frame at the current time.

The method may further comprise the step of storing the frames being received by one or more input ports into one or more queues and transmit the frames via the one or more output ports according to the configuration.

According to an embodiment, the method may further comprise the step of receiving the configuration and storing it. For example the configuration may be received from a Central Network Configuration, CNC, device, stored in a switching device and applied by the switching device in its further operation.

In an exemplary implementation, the method further includes receiving a frame for which no timing is indicated in the configuration; and transmitting the frame at a time where no frame specified in the configuration is to be transmitted according to the configuration.

According to an aspect, a method is provided for scheduling a transmission of a flow from a source to a destination via one or more intermediate nodes in a Time Sensitive Network, TSN, the one or more intermediate nodes including a subset of intermediate nodes. The method comprises: calculating, for each intermediate node of the subset, a configuration indicating for the flow a timing in which a frame pertaining to the flow is to be output from the intermediate node, and outputting the configuration to the one or more intermediate nodes of the subset.

Moreover, the method may include calculating configurations for a plurality of flows and chosen such that the least number of queues is used. The configurations may be chosen such that a plurality of frames are not stored to the same queue in an intermediate node if they are scheduled to be transmitted in an order other than the order they are scheduled to be received by the intermediate node, and otherwise, the configurations can be chosen such that the plurality of frames is stored to the same queue.

In some embodiments, the method may further include receiving flow information comprising the source address and the destination address and the timing for the flow, and calculating the configuration based on the received flow information.

The method for operating an intermediate node and/or the method for scheduling flow transmission in the network may employ the configuration which comprises flow information identifying the flow by a source address and a destination address of the flow or by a value of a flow identifier.

For example, in some implementations, the configuration comprises information in which queue the frame is stored and/or information specifying over which output port the frame is to be transmitted.

In some implementations, the frame is a MAC frame including a source address and a destination address of the flow in MAC frame header. Herein, the flow identifies a periodic data transmission from one end station of the TSN to another end station.

Any of the methods mentioned above may be implemented as a software code including the code instructions, which implement the above-mentioned method steps. The software may be stored in a computer readable medium. The medium may be a processor memory, any storage medium or the like. The software may be used in devices such as control device or switch referred to above.

Details of one or more embodiments are set forth in the accompanying drawings and the description below. Other features, objects, and advantages will be apparent from the description, drawings, and claims.

BRIEF DESCRIPTION OF THE DRAWINGS

In the following embodiments of the invention are described in more detail with reference to the attached figures and drawings, in which.

In the following identical reference signs refer to identical or at least functionally equivalent features if not explicitly specified otherwise.

DETAILED DESCRIPTION OF THE EMBODIMENTS

In the following description, reference is made to the accompanying figures, which form part of the disclosure, and which show, by way of illustration, specific aspects of embodiments of the invention or specific aspects in which embodiments of the present invention may be used. It is understood that embodiments of the invention may be used in other aspects and comprise structural or logical changes not depicted in the figures. The following detailed description, therefore, is not to be taken in a limiting sense, and the scope of the present invention is defined by the appended claims.

For instance, it is understood that a disclosure in connection with a described method may also hold true for a corresponding device or system configured to perform the method and vice versa. For example, if one or a plurality of specific method steps are described, a corresponding device may include one or a plurality of units, e.g. functional units, to perform the described one or plurality of method steps (e.g. one unit performing the one or plurality of steps, or a plurality of units each performing one or more of the plurality of steps), even if such one or more units are not explicitly described or illustrated in the figures. On the other hand, for example, if a specific apparatus is described based on one or a plurality of units, e.g. functional units, a corresponding method may include one step to perform the functionality of the one or plurality of units (e.g. one step performing the functionality of the one or plurality of units, or a plurality of steps each performing the functionality of one or more of the plurality of units), even if such one or plurality of steps are not explicitly described or illustrated in the figures. Further, it is understood that the features of the various exemplary embodiments and/or aspects described herein may be combined with each other, unless specifically noted otherwise.

Figure 1A:
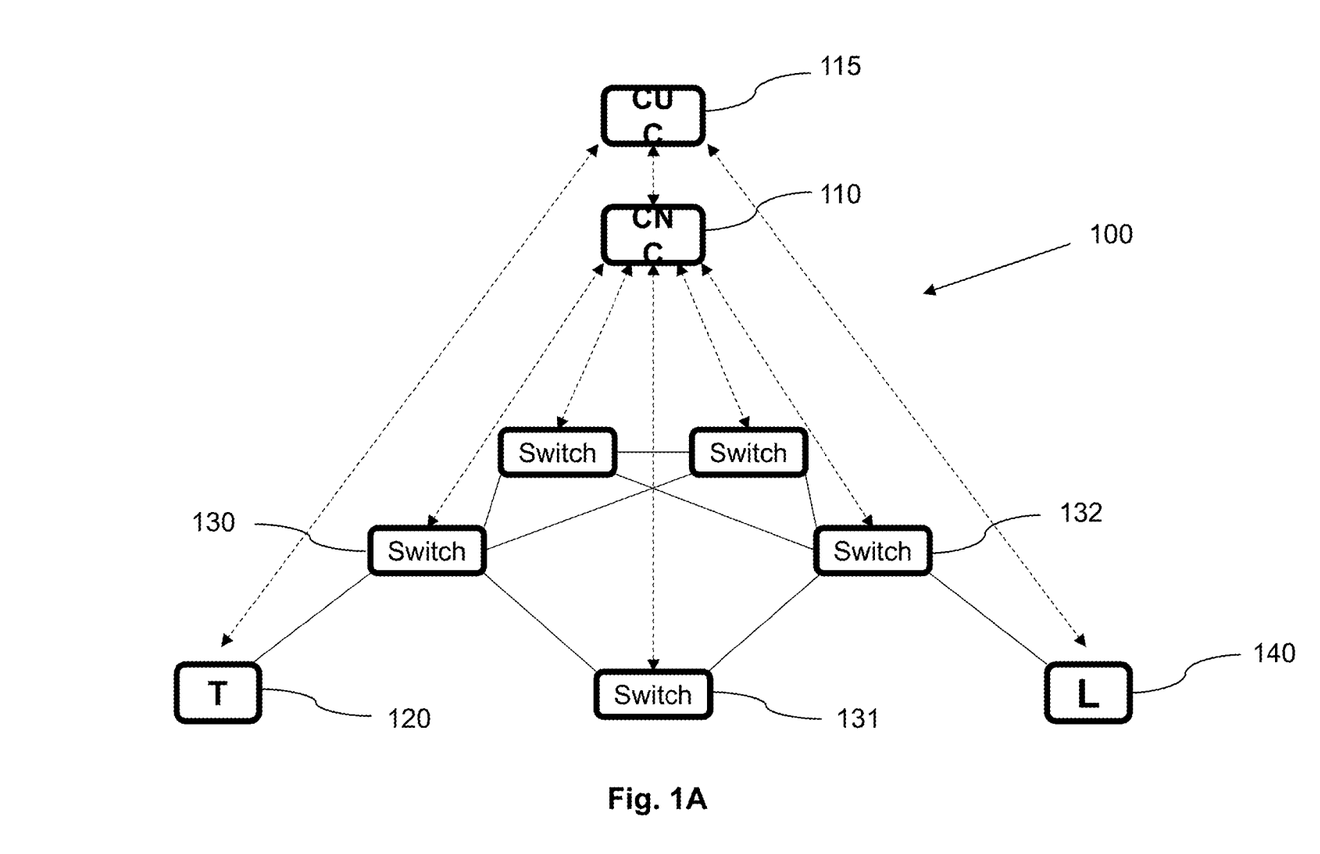
FIG. 1A is a block diagram showing an overview of an example of a TSN with a centralized management/configuration model.

Time Sensitive Networks (TSNs) are typically employed in industrial applications such as production plants and automotive requiring high reliability and safety, as well as low delay. An exemplary overview of a TSN 100 is illustrated in FIG. 1A. The talker node 120 and the listener node 140 use the TSN to communicate. In this example, only one listener and one talker node are shown. However, in general there can be multiple talker and listener nodes.

Information in the network are transmitted via intermediate nodes that are configured by the management nodes. The intermediate nodes are switches 130, 131, 132. A switch is a networking device that connects devices on a network by using packet switching to receive, process, and forward data to the destination or listener device. The switches can be interconnected in various ways. This may lead to different possible paths for the transmission of information from a talker node to a listener node. The management nodes in this example include a Centralized User Configuration (CUC) 115 and a Centralized Network Configuration (CNC) 110. As mentioned above, the CNC performs the configuration of the network nodes. The timed configurations might be applied to all nodes of the TSN or just to the switches. In the latter case, the first switch (130 in this example) connected to a talker node has to act as a synchronization gate. In this example, the CUC 115 communicates with the potential talker and listener nodes. When a talker or a listener node notifies the CUC that a data transmission or a flow needs to be sent over the TSN, the CUC notifies the Centralized Network Configuration (CNC) module about the associated parameters (network cycle time, latency, jitter requirements, etc.) of the joining flow.

Information pertaining to a flow from a particular talker to a particular listener often need to be sent periodically. Each periodically occurring instance of a flow is a frame. A flow may define a periodic data transfer that occurs from a talker node to a listener node with pertaining requirements. The network then searches for a solution that guarantees timeliness of delivery for all frames pertaining to all flows that are registered with the CNC or CUC. This may be done by the CNC. Such a solution can be called configuration or schedule for the network and, in particular, respective network entities. When a schedule for the whole network is decided upon, a configuration for each switch can be created. All switch configurations together can be called configuration of the network.

Typically, TSN traffic is scheduled according to such a configuration which predefines for each flow all the times when frames pertaining to the flow that are stored in a queue in a node are to be transmitted, and to which node they are to be transmitted. Different schemes can be used in TSNs to map traffic to queues. For example, traffic can be prioritized and packets from each traffic class can be mapped to the corresponding queues.

However, besides the traffic that is registered with the CNC 110 or CUC 115 (scheduled traffic), unscheduled traffic may be transmitted through the same network. Usually the scheduled traffic has the highest priority in the network, and unscheduled traffic can only use resources that are not used by the scheduled traffic. In many cases, there are many different possible combinations of paths to transmit all frames pertaining to all registered flows while fulfilling all requirements of these flows. However, these combinations of paths (or available solutions) may use the networks resources to a different degree, leaving a different degree of the networks resources to the unscheduled traffic. I.e. the number of queues in the switches that are used to buffer frames can be different for different solutions or network configurations. If less queues are used by the scheduled traffic, more queues can be used by the unscheduled traffic.

The scheduling methodology may be designed in a centralized mode, where a CNC 110 is the entity to compute the configuration parameters. The overall operations of a TSN according to an embodiment of the present disclosure is illustrated in FIG. 1A. The centralized control here is shown as a separate Centralized User Configuration 115 (CUC), and a CNC 110. In this example, communication with potential talker 120 and listener 140 end stations of the TSN and potentially interaction with users is handled by the CUC 115. Configuration of and communication with all intermediate nodes of the TSN is handled by the CNC 110. However, CUC 115 and CNC 110 can also be integrated in a single device.

FIG. 1A shows a network including a device 110 for scheduling a transmission of a data packet from a talker node 120 to a listener node 140 via one or more intermediate nodes 130, 131, 132. With such a network a guaranteed bounded jitter and end-to-end, E2E, latency can be achieved.

Scheduled communication in the network is carried out through the concept of flows. A flow is a periodic data transmission (frame) from one end station (also denoted as talker or source) 120 to another end station 140 (also denoted as listener or destination). The network can be modeled as a graph where the nodes represent the switches and the end stations (such as camera, PLC, sensor, actuator, etc.), and the edges represent the physical connections (e.g. Ethernet links) between the nodes.

For example, at each scheduled transmission instance, a frame is sent from the scheduled source 120 to the scheduled destination 140. The frame may need to pass several switches 130, 131, 132. Switches are configured to pass the frames to the respective configured outputs, and thus to the configured consecutive node (e.g. another switch or destination node). In the switches, there is typically a buffer in order to compensate for potential jitter or to make it possible to receive and transmit frames in a different order. The frames may be buffered at ingress or egress buffers. The buffered frames form a queue. The queues are usually First-In First-Out (FIFO) queues, meaning that the oldest frame in the queue is output first.

In real-time communication in automotive and industrial domains, deterministic behavior and guaranteeing bounded jitter and end-to-end latency are desirable. The determinism for critical data traffic can be achieved, for example, using time-triggered schedules.

Deterministic means that the location of frames is desired to be deterministic at any time within the network.

In order to achieve a communication as close as possible to a deterministic schedule, it is desirable that even in cases of failures, delays, missing packets, or other disturbances the behavior of the network is still defined. In order to improve the deterministic behavior, according to some embodiments, timing per flow is considered as a part of schedule. This implies switch behavior and/or the CNC computation as will be exemplified in the following.

In the example of a TSN 100 shown in FIG. 1A, the device 110 comprises processing circuitry configured to determine time triggered schedules considering each flow and each frame that needs to be transmitted with timeliness guarantees, containing for each flow a complete path through the TSN, i.e. deterministic times when and to which consecutive node the frame is to be transmitted from each of the intermediate nodes 130, 131, 132. Especially when a plurality of flows are scheduled, this task is not trivial. Such a schedule can be in the form of a gate open list or gate control list and is also called configuration for the nodes of the TSN.

Figure 2:
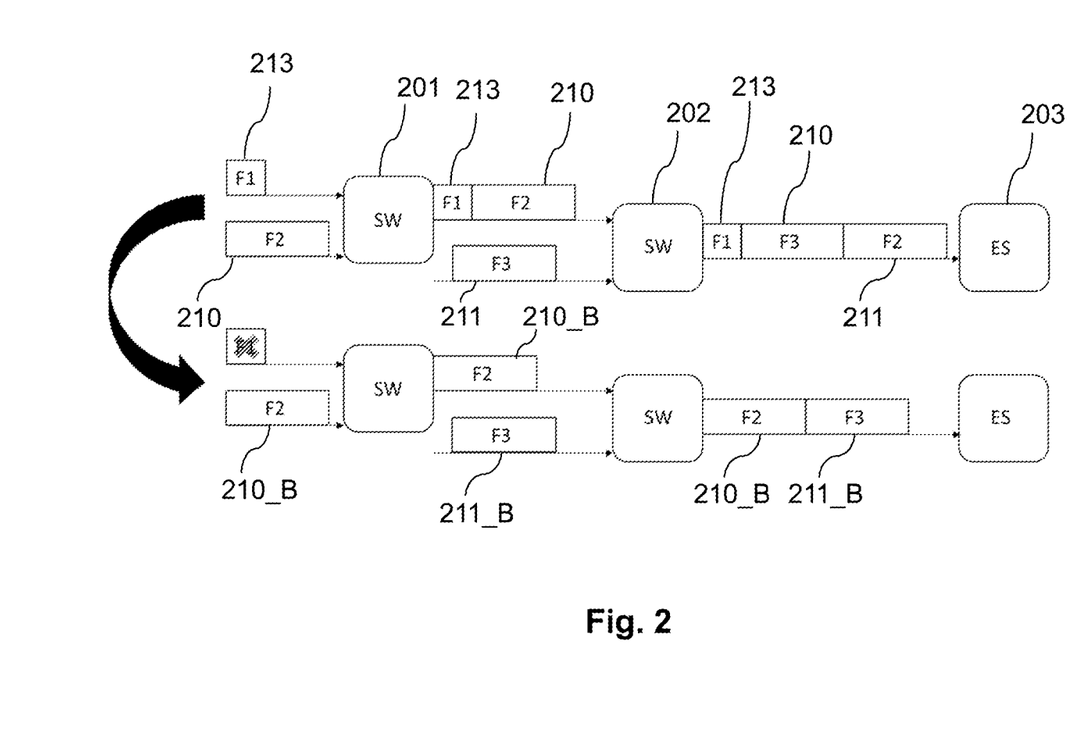
FIG. 2 is a block diagram showing an example for how loss of a frame can lead to nondeterministic behavior and jitter in consequent nodes of a TSN.

The network of switches should be capable to carry out the transmission tasks as scheduled. A problem with the transmission of one frame could disturb the transmission of other frames in a conventional TSN. Frames can be lost during transmission on their path or dropped due to time-based ingress policing (e.g. IEEE 802.1Qci). An example of such a situation is shown in FIG. 2. The arrows between the switches (e.g. 201, 202, 203) are to be understood as time axes. I.e., the leftmost frame of each arrow is transmitted first. When a frame 213 is lost, another frame 210_B could be dispatched instead of the frame scheduled for transmission. I.e. frame 210_B could be sent earlier than it was intended be sent. In such a situation (when the frame is lost), it needs to be ensured that no other frame is sent earlier than scheduled as this could cause delays of other frames in subsequent switches and thus leads to non-determinism and jitter. In the lower part of FIG. 2, frame 213 is lost. When switch 201 then opens a gate to transmit a frame according to the schedule (in this case, at the time, frame 213 should be sent), it instead transmits frame 210_B to switch 202. Consequently, switch 202 receives frame 210_B first, and then frame 211_B coming from another switch. If, for example, frame 210_B is longer than the lost frame 213, this leads to a delay in the transmission of frame 211_B to switch 203.

A possible path to make TSNs robust to frame loss is described in "Scheduling real-time communication in IEEE 802.1 Qbv time sensitive networks" by S. S. Craciunas, R. S. Oliver, M. Chmelik, and W. Steiner, in Proceedings of the 24th International Conference on Real-Time Networks and Systems. ACM, 2016, pp. 183-192 (referred to as [1] in the following). The authors propose an SMT model over linear integer arithmetic that finds exact transmission offset for each frame with the objective to minimize the number of used queues. The frame isolation constraint (FIC) proposed in this paper enforces that a frame must be dispatched from a queue before another frame from a different flow can be stored in the same queue. That is, there are never frames of different flows stored in one queue at the same moment. Therefore, when a flow contains one frame only, the second position in the queue is never used. This approach tends to require more queues for the time-triggered traffic. Hence, the throughput of the network deteriorates.

In order to improve the deterministic behavior of a network and to avoid having to implement the unfavorable FIC to handle frame losses or other disruptions, according to an embodiment, a switch device is provided for operating as an intermediate node in a Time Sensitive Network, TSN. The switch device may be any of the switches 130, 131, 132 in the TSN 100 in FIG. 1A. Such switch comprises a storage unit storing a configuration indicating for a flow a timing in which a frame pertaining to the flow is to be output. The storage may be any kind of memory such as a volatile memory. However, the present disclosure is not limited to any particular type of storage. The configuration may determine when each frame pertaining to the flow is to be transmitted and to which node of the TSN. Moreover, the switch further comprises a processing circuitry, which is configured to receive a frame pertaining to the flow, and, in a case where the frame is to be transmitted at a current time according to the configuration, transmit the frame at the current time, and, otherwise, do not transmit the frame at the current time. For example, the processing circuitry may be configured to check whether the frame is to be transmitted at the current time based on the stored configuration and to transmit the frame only if affirmative.

To assign a received frame to a frame pertaining to a flow specified in the configuration, the switch device may read out the source and the destination of the frame and compare it with the source and destination specified in the configuration. The source and destination may be identified in the frame header. Alternatively, each flow might have an ID assigned and every frame might carry this ID. In network architectures in which a flow ID is associated with a particular source and destination, the flow ID may be signaled in the frame header or body instead of the source and destination. However, the present disclosure is not limited to such architectures. In principle, the flow ID may be carried in the frame in addition to the source and the destination. The source and the destination may be indicated in the frame in any way. It may be an identifier of the node, which is recognized by the switch, or directly a node address. For example, the frames may be medium access control (MAC) frames. In this case, the source and the destination may be indicated as MAC addresses of the respective source node and destination node.

Furthermore, as frames pertaining to the same flow might have certain similar characteristics, the switch device might also identify the frame based on those characteristics. The switch device might use a neural network to identify to the frames or any other manner of identifying the frames, e.g. based on conditions.

The processing circuitry may be any hardware and/or software, including one or more of an application-specific integrated circuit (ASIC), field-programmable gate array (FPGA), digital signal processor (DSP), or any kind of clocked (i.e. synchronous) signal processing circuitry.

By deploying one or more switches transmitting the frame for a certain flow only on its configured timing, the deterministic behavior of the network 100 is improved. This is true for any potential disturbance in the transmission of frames.

In particular, a network with switches according to this embodiment is more robust against loss or large jitter of single frames without the need to implement the FIC. This may mean that when a single frame is lost or dropped by the network, this does not affect the timeliness of the transmission of other frames or flows.

Figure 3:
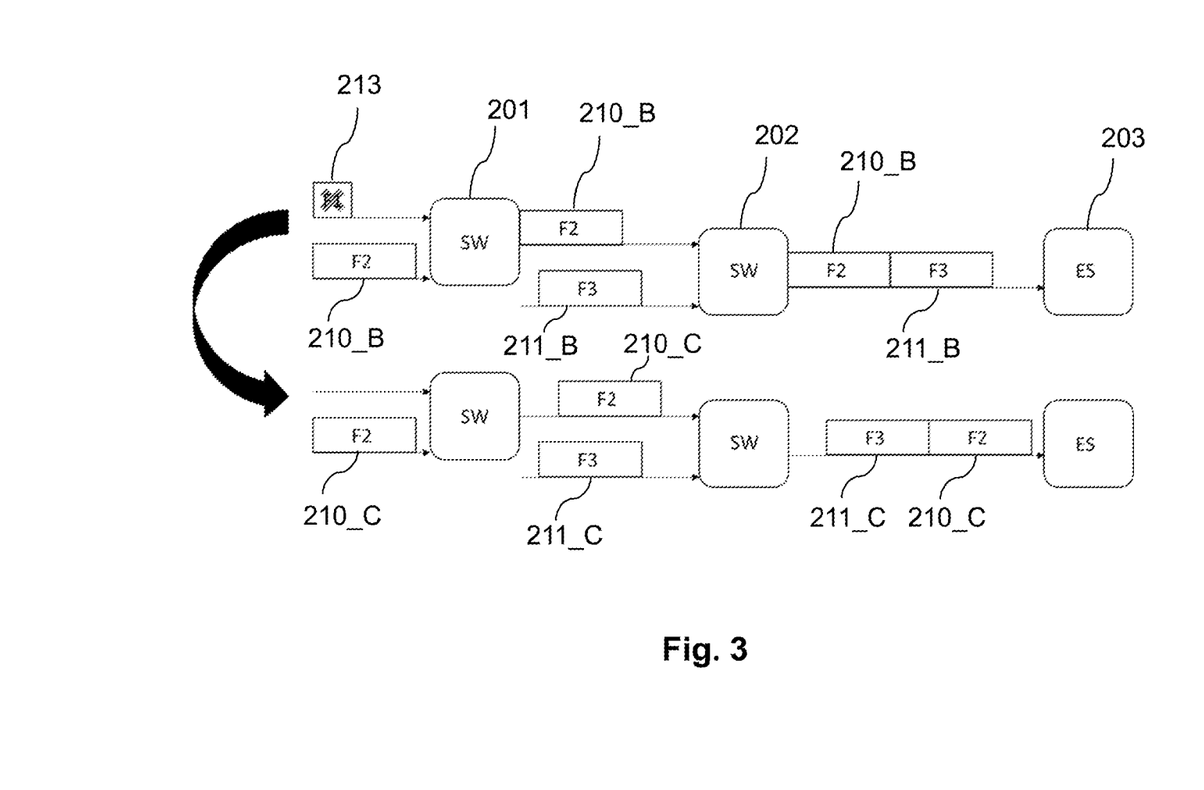
FIG. 3 is a block diagram showing an example of how nondeterministic behavior due to frame loss can be avoided by auditing the timing for each frame before sending it.
Figure 4:
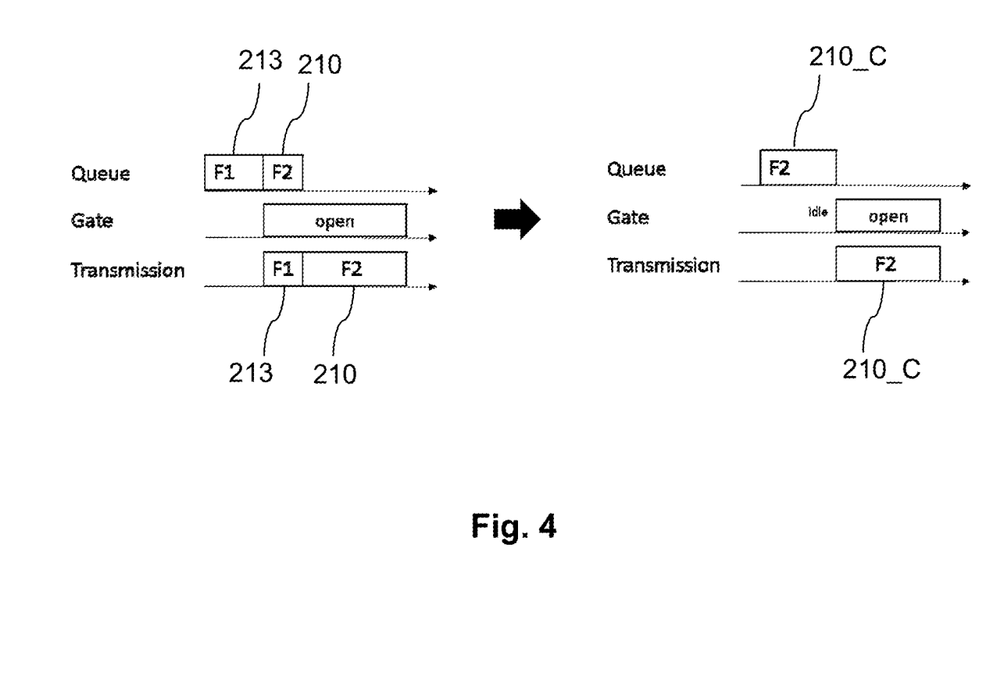
FIG. 4 is a block diagram showing an example of operation of a timed gate. On the left side, two frames are received and both are transmitted when the gate is opened. On the right side, one frame is missing, and the gate waits before transmitting the second frame in due time.

This operation for a plurality of flows (frames) is further exemplified in FIG. 3 and FIG. 4. Such operation may be implemented, for example, by one or more switches 130, 131, and 132 illustrated in FIG. 1. The switch 130, 131 or 132 (and the link to the consecutive node) remains idle until the right time when frame 210_C is scheduled to be sent. A loss of frame 213 will not cause 210_C to be sent earlier than scheduled, and hence, the timeliness guarantees are maintained and frame 210_C and 211_C are sent at the planned times.

This approach makes it possible to abandon the scheduling constraint proposed in [1]. Details regarding the new scheduling constraints and mechanisms to impose the idling during a gate open event will be discussed in details in the following. The proposed solution offers more schedulable instances, higher throughput of the network as well as potential standardization value.

The frame isolation constraint (FIC) can be avoided if switches according to this embodiment are used. In this embodiment, switches (e.g. 130, 131, and/or 132) check whether they are about to send the right frame according to their respective predefined or preconfigured schedule. If there is a frame to be sent not according to the schedule, the switch will be idle instead of sending a different frame than intended.

This can be implemented, for example, by including an additional look-up table in the network processor (NP), allowing finer granularity checking between the (buffered) frames and the computed schedule (i.e., gate open instance). The look-up table may store an identification of a flow or frame and a timing indicating when a frame is to be transmitted.

Examples in FIG. 2 and FIG. 3 show two frames 213 (frame from flow 1) and 210, 210_B or 210_C (frame from flow 2) buffered in the same queue with the correct transmission order computed by the scheduler during one gate open instance. With an existing TSN compatible chipset for a switch device (leading to a dataflow as shown in FIG. 2), a frame from the associated queue will be scheduled (e.g. to be transmitted to a next node) during the gate open window regardless of whether it is the correct frame to send. With the additional check operation shown in the present disclosure, the switch will check whether the right frame is buffered and scheduled from the queue at a particular point of time (FIG. 3). If the frame supposed to be scheduled (say 213) is lost at some point of time and that frame is not the HOL (head-of-line) packet in the buffer, the switch will not schedule the HOL frame (210, 210_B or 210_C in this example) in the queue (it remains idle) until the correct transmission time computed for 210 approaches (FIG. 3, lower part of the figure). The timeliness of this is also elaborated in FIG. 4. Here, one queue is shown. If frame 213 is lost, the gate to transmit frame 210_C remains idle until the correct transmission time.

Figure 6:
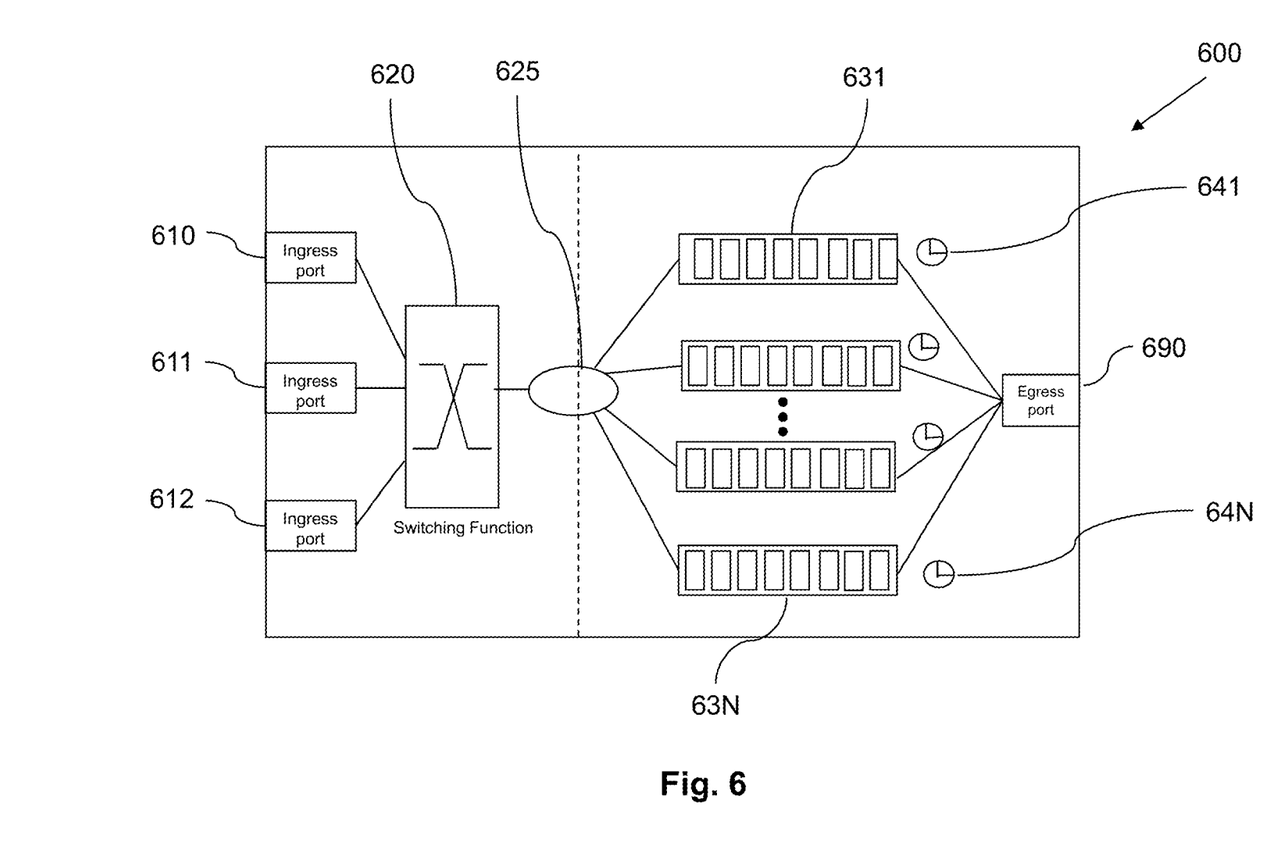
FIG. 6 is a block diagram showing a scheme of an example of a switch used in a TSN.

An exemplary switch device (corresponding to devices 130, 131, 132 in FIG. 1) for operating as an intermediate node in a TSN 100 according to an embodiment is shown in FIG. 6 as switch device 600. The switch device 600 comprises a storage unit in which it stores a configuration that determines the timing for frames pertaining to each flow (not shown). This configuration may determine when each frame pertaining to the flow is to be transmitted and to which node of the TSN or, in other words, to which egress port (e.g. 690).

The switch device 600 receives a frame from another node of the TSN in one of its ingress ports 610 and stores the frame. The switching function 620 directs the frame to the corresponding egress port. A traffic classifier 625 may distribute the frames to the associated queue 631 to 63N of the egress port 690. The distribution may be based on classification criteria like the priority code point of the header. In another embodiment, the traffic classifier may choose to which queue the frame is to be sent based on the configuration received from the CNC. For this, the configuration may contain additional information determining to which egress queue a frame is to be stored.

Each queue has a timed gate 641 to 64N. In different instances of switches according to the present disclosure, a switch may have a predefined number of egress queues (for example, 8) per port given by the hardware or software design, and any predefined number of ingress and egress ports. In the exemplary switch device shown in FIG. 6, each head-of-line frame in each egress queue is identified.

Before a gate is opened at a time, the switch uses the configuration received from the CNC to determine whether the head-of-line frame (meaning the frame that is in the FIFO queue the first to be output) is the frame that is scheduled to be sent at the time. If the head-of-line frame is not the right frame to be sent at the time, the gate is not opened at the time and no frame is transmitted from that queue. However, a frame from another queue with a lower priority may be transmitted.

Before the switch device 600 opens the gate of the queue in which the frame was stored to transmit the frame at the head of the queue, it may check whether the head-of-queue frame is the right frame to be transmitted at this time. Each frame is not transmitted until the time specified in the configuration has come.

In a further embodiment, as mentioned above, the switch device might also handle data traffic that is not scheduled deterministically. In other words, if a gate control mechanism is used, it may rule over any priorities being assigned to other data. In such cases, the scheduled traffic might always have priority regarding transmission over the non-scheduled traffic. Non-scheduled flows might interfere with each other, but not with scheduled flows. In some implementations of a switch, some queues may not be available for scheduled traffic but for unscheduled traffic.

In one embodiment, the switch device receives the configuration from a Central Network Configuration, CNC. The processing circuitry may be configured to store the received configuration to the storage unit.

Figure 1B:
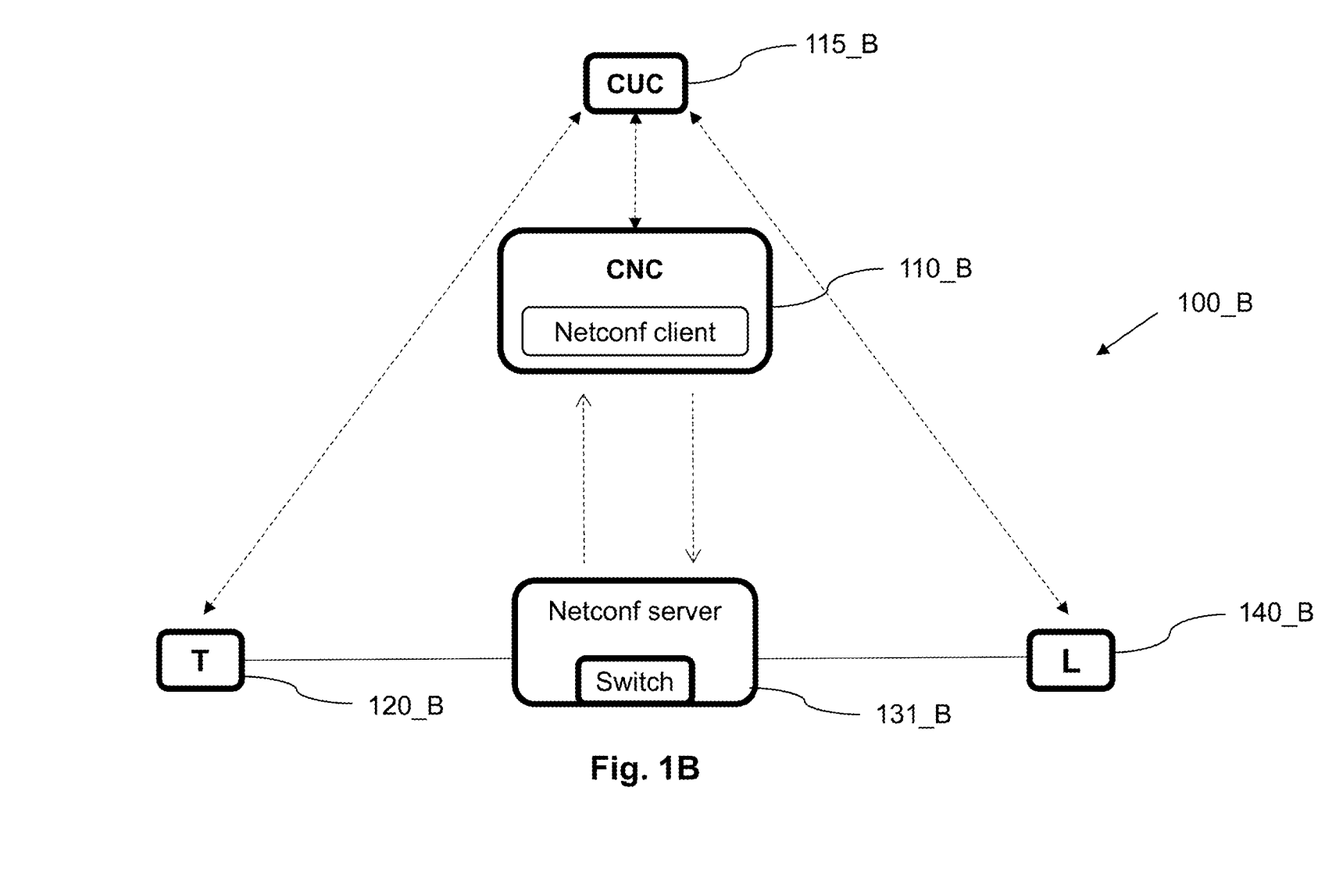
FIG. 1B is a block diagram showing an overview of an example of a TSN with the centralized management using NETCONF to configure the switches.

FIG. 1B shows an example of the CNC 110_B and the switches (e.g. 131_B) of a TSN 100_B using the Network Configuration Protocol (NETCONF) for reconfiguration of the switches by the CNC. NETCONF is a network management protocol developed and standardized by the IETF. NETCONF provides mechanisms to install, manipulate, and delete the configuration of network devices.

The configuration for the switches of a TSN according to an embodiment differs from configurations of other TSNs in that it contains additional entries. These entries enable the switches to identify frames and to allocate a time when each frame is to be sent. Furthermore, as described above, the frame isolation constraint is not needed as one of the constraints that define which configurations of the TSN may be chosen by the TSN. Consequently, a CNC chooses an optimal configuration out of a set of configurations that is not constrained by the FIC, and the CNC creates configurations that enable the switches to check the timing of frames.

For a particular TSN with a particular set of flows that are to be scheduled, there is often a plurality of solutions for the time-triggered schedule to satisfy the requirements of all flows. As mentioned above, in some embodiments, there might be secondary communication that does not need deterministic scheduling transmitted through the same network. This is one reason to choose, out of the plurality of solutions for the time-triggered schedule, a solution that uses the least capacity of the intermediate nodes. However, it is noted that the network does not have to allow other than deterministically scheduled communication. The present disclosure is applicable for either of these two scenarios.

In some embodiments, a solution is chosen that uses the least number of queues used by the deterministically scheduled traffic. This might be the smallest number of queues used in switches that are critical for a high throughput of non-scheduled traffic or the solution with the smallest accrued sum of used queues in all switches. However, instead of the accrued sum of the queues used, the CNC might, for instance, minimize the sum of the squared number of queues used per switch or the root mean squared number of queues or any other function or metric of the number of queues. There may be some additional constraints on minimum and maximum number of queues per switch.

A control device or Central Network Configuration (CNC) for scheduling a transmission of a flow from a source to a destination via one or more intermediate nodes in a TSN according to an embodiment comprises a processing circuitry configured to determine (e.g. calculate) for each intermediate node that contributes to the transmission a configuration indicating for the flow a timing in which a frame pertaining to the flow is to be output from the intermediate node. The configuration can further indicate an egress port, a gate ID and an indicator for preemption. The timing may be indicated implicitly, e.g. in terms of the durations of one or more preceding frames.

The processing circuitry may be any data processing hardware or combination of hardware and software. The hardware may include, for example, one or more field programmable gate arrays (FPGAs), digital signal processors, or other processing modules. In one embodiment, the processing circuitry comprises one or more processors and a memory containing program code that can be read and executed by the one or more processors to perform the operations described herein.

Figure 5:
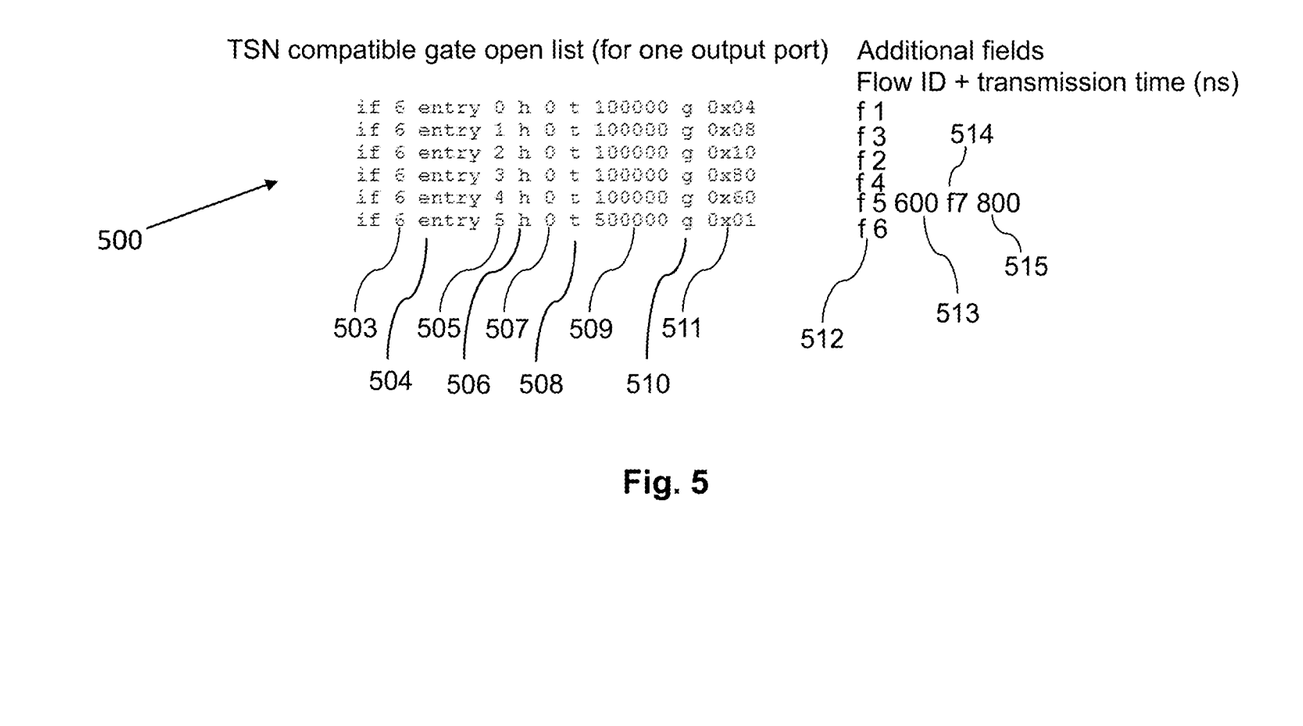
FIG. 5 is a list showing an example of a gate open list or configuration for a switch of a TSN.

FIG. 5 shows an example list containing information of the configuration or gate-open list transmitted from a CNC to a node in the TSN. The left side of the list shown here contains entries that may be used also in some conventional TSNs. In this example, column 503 specifies the port (interface) to which a frame is sent. In column 505, the gate open instance indicated in the respective row of the table is specified. In column 507, a preemption of the gate opening (corresponding to priority) is specified in the respective row. Column 509 indicates the timing of the gate-opening event. In this example, the timing (duration) of each gate opening is given in nano seconds. All durations of gate opening events above each row determine the timing of the respective gate opening within one network cycle in this example. Column 511 indicates the gate(s) that is/are to be opened according to the respective row. In particular, gate no. 4 is to be opened for 100 microseconds, and then gate no. 8 is to be opened for 100 microseconds, etc. At the end of the cycle, gate no. 1 is to be opened for 500 microseconds.

Information that facilitate using a TSN according to the above-described embodiment are shown on the right side of FIG. 5. Column 512 contains information to identify which frame is to be transmitted in the respective opening instance. In this example, a flow ID is given. For example, the gate 4 opens for 100 microseconds for flow with the identifier f1. Then the gate 8 opens for 100 microseconds for flow with the identifier f3, etc.

It is noted that one gate opening does not necessarily mean transmission of a single frame. Optionally an additional transmission time 513 for the flow can be specified, and more entries containing a flow ID 514 and a respective transmission time 515 can be added in case that several frames, potentially pertaining to different flows, stored in the queue pertaining to the gate specified in the respective line of the table are to be transmitted in the same gate open instance. Although in this picture there are maximum two flow IDs (f5 and f7) and corresponding transmission times (600 and 800) listed, there may be any number of flow IDs with corresponding transmission times.

In other embodiments, the configuration table shown in FIG. 5 can be smaller. Instead of specifying each entry of the table with a describing entry (504, 506, 508, 510) and the corresponding value (503, 505, 507, 509, 511), it may be sufficient to define a fixed order and presence of the values. In other words, if a format is agreed upon in advance between the CNC and the switch devices, the specifiers for the columns could be left out completely.

In general, the format of the configuration shown in FIG. 5 is merely exemplary. The gate-opening list (configuration) can be constructed by a YANG model that defines data sent over network management protocols. In other words, a YANG model specifies structure elements of the control data carrying a configuration provided for example from the CNC to a switch. Some exemplary structure elements are output port, priority, or the like. As mentioned above, additional structure elements in the YANG model defining one or more flow-IDs and corresponding timings lead to the corresponding elements in the configuration. It is noted that the new entries can be added to different established YANG models that are used in TSNs. The particular format to be used may depend on the actual deployment, size and constraints of the network. For example, preemption/priority may not be necessary. Some further parameters may be added. The gate open list could also be encoded in a different way, where two additional columns specifying the transmission order of flows as well as their transmission time during the computed gate open instance are included. The additional entries are compatible with conventional gate open lists. The switch devices may also work as switch devices in conventional TSNs without the additional entries in the gate open lists.

Furthermore, the processing circuitry of the CNC device may be configured to transmit the configuration to a node in the TSN, the node being switch and/or source/destination node. Several switches may be present in the TSN and the processing circuitry might be configured to provide a configuration to each or some of the switches and do each or some of the edge nodes. Multiple flows might be registered at the CNC. In such a case, all registered flows are to be considered when calculating the configuration to achieve a highly deterministic schedule.

When configurations for the intermediate nodes of the TSN are calculated for a plurality of flows, they can be chosen such that the least number of queues (631 to 634) is used. However, the present disclosure is not limited to such cost function, configurations might be chosen where other cost optimization is employed; for example, the average number of queues per switch is minimized, or other metric or function of the queues is minimized or maximized. Limiting the number of queues may facilitate a more efficient switch implementation and more efficient switch operation.

A configuration of a TSN can be the total of the individual configurations of the switches of the TSN. In other words, the CNC computes a deterministic schedule for each of the switch device in the TSN network. Available configurations of the TSN are configurations for which all requirements of all registered flows are fulfilled. Available configurations can be determined by the CNC by checking whether certain constraints that relate to the requirements of the flows and to physical constraints of the network are fulfilled. As mentioned above, in TSNs according to [1] a frame isolation constraint (FIC) is applied. This means that no two frames pertaining to different flows may ever be stored to a same queue in the TSN.

$f_{i,j}^{(v_a,v_b)}.\phi$ ... transmission offset of frame $f_{i,j}^{(v_a,v_b)}$ or flow $s_i$ on link $(v_a,v_b)$ $s_i^{(v_a,v_b)}.p$ ... queue to which flow $s_i$ on link $(v_a,v_b)$ is stored Frame Isolation Constraint $$\forall (v_a, v_b) \in \mathcal{L}, \forall s_i, s_k \in S, i \neq k, \forall f_{i,j}^{(v_a,v_b)} \in \mathcal{F}_i^{(v_a,v_b)},$$
$$\forall f_{k,l}^{(v_a,v_b)} \in \mathcal{F}_k^{(v_a,v_b)} : \left(f_{i,j}^{(v_a,v_b)} \cdot \phi \leq f_{k,l}^{(v_a,v_b)} \cdot \phi + (v_y, v_a) \cdot d\right) \vee$$
$$\left(f_{k,l}^{(v_a,v_b)} \cdot \phi \leq f_{i,j}^{(v_x,v_b)} \cdot \phi + (v_x, v_a) \cdot d\right) \vee \left(s_i^{(v_a,v_b)} \cdot p \neq s_k^{(v_a,v_b)} \cdot p\right)$$

Here, $(v_a,v_b).d$ denotes the delay of link $(v_a,v_b)$. $\mathcal{L}$ is the set of links in the network. $\mathcal{F}$ denotes the set of all flows, and $\mathcal{F}^{(v_a,v_b)}$ denotes the set of all flows routed through link $(v_a,v_b)$.

The FIC ensures that if a frame of one flow is lost or omitted, no frame pertaining to a different flow is transmitted in its place. However, in TSNs according to present disclosure, it is not necessary that the FIC is fulfilled anymore. This is the case because TSNs using switches according to embodiments described herein, each flow and thus frame is identified and it is checked whether it is the right frame to be dispatched from the respective queue at a given time instant.

However, a queue order constraint (QOC) is added in instances of TSNs according to the present disclosure to constrain the available configurations that can be sent to the switches so as to ensure that the frames are dispatched from a (FIFO) queue in the same order as they have been enqueued. FIC is then substituted by the following Queue order constraint.

Queue Order Constraint $$\forall (v_a, v_b) \in \mathcal{L}, \forall s_i, s_k \in S, i \neq k, \forall f_{i,j}^{(v_a,v_b)} \in \mathcal{F}_i^{(v_a,v_b)},$$
$$\forall f_{k,l}^{(v_a,v_b)} \in \mathcal{F}_k^{(v_a,v_b)} : \left(f_{i,j}^{(v_a,v_b)} \cdot \phi + \frac{s_i \cdot pl}{(v_x, v_a) \cdot c} + (v_x, v_a) \cdot d \leq \right.$$
$$\left. f_{k,l}^{(v_y,v_b)} \cdot \phi + \frac{s_k \cdot pl}{(v_y, v_a) \cdot c} + (v_y, v_a) \cdot d \right) \&$$
$$f_{i,j}^{(v_a,v_b)} \cdot \phi \leq f_{k,l}^{(v_a,v_b)} \cdot \phi\right) \vee \left(f_{k,l}^{(v_y,v_b)} \cdot \phi + \frac{s_k \cdot pl}{(v_y, v_a) \cdot c} + (v_y, v_a) \cdot d \leq \right.$$
$$\left. f_{i,j}^{(v_x,v_b)} \cdot \phi + \frac{s_i \cdot pl}{(v_x, v_a) \cdot c} + (v_x, v_a) \cdot d \right) \&$$
$$f_{k,l}^{(v_a,v_b)} \cdot \phi \leq f_{i,j}^{(v_a,v_b)} \cdot \phi\right) \vee \left(s_i^{(v_a,v_b)} \cdot p \neq s_k^{(v_a,v_b)} \cdot p\right)$$

Where the syntax is the same as for the FIC shown above. Further, $(v_x,v_a).c$ denotes the speed of link $(v_x,v_a)$. The payload of a flow $s_i$ is denoted by $s_i.pl$.

One or all of several other constraints may have to be fulfilled by the configurations that can be chosen by the CNC. One of those constraints may be the Frame Constraint, which ensures that transmitting a frame on the first link of the routed path cannot start before the release time from the talker node and must be completed on the last link before the deadline.

Another constraint may be the Link Constraint, which ensures that the transmission of a frame from a switch can start only after the frame is fully delivered to and processed by the switch.

A further constraint may be the Queue Usage Bounds constraint. This constraint ensures correct assignment of a queue on each egress port for each flow. This may ensure that a scheduled frame is stored to a queue that is available for scheduled traffic.

In an implementation of a CNC according to an embodiment, the CNC receives information on the source and the destination of a flow and information on the requirements (e.g. regarding timing, priority, or the like) of the flow and calculates based on some of or all constraints mentioned above the configuration for each switch involved.

It is noted that in general, the present disclosure is not limited to switches, which receive a configuration from the CNC. The switched may be manually configurable, by storing therein the configuration designed with a specific tool or pre-computed when designing the TSN. However, in particular for some larger networks, it may be advantageous to support not only the initial configuration but also a re-configuration. The re-configuration may take place, e.g. when a new source or destination node is added and/or when a new flow between existing sources and destinations is added. On such occasion, new configurations may be calculated for all respective nodes of the TSN network. Depending on the implementation, the calculation and re-configuration may be performed during the operation of the TSN network, or in an offline state. The re-configuration during the operation of the TNS may be performed by providing to each node the new configuration, as well as the time instance (e.g. in terms of network cycle identification) from which on the new configuration (schedule) is to be employed. However, the present disclosure is not limited to any particular re-configuration approach. The time instance for employing the new configuration may also be fixed with respect to the cycle in which the new configuration has been provided by the CNC.

The configuration may comprise flow information identifying the flow by a source address and a destination address or by a value of a flow identifier. As shown in FIG. 5, the flowID (f1, f2, . . . , f7) may be explicitly provided in association with the timing for opening the corresponding gate for the respective frame and, optionally, further features such as priority of the frame, an output port, or the like. The configuration associating each frame with a gate (which may correspond to a queue) in the switch may be used by the switch to store the frame to the corresponding queue when receiving the frame. The present disclosure is not limited to any particular format of the configuration. As mentioned above, the flow may be identified explicitly or implicitly by specifying its source and destination (and possibly priority).

In some implementations, as mentioned above, a frame is a MAC frame including a source address and a destination address of the flow in MAC frame header. However, even though the MAC header already carries source and destination address, in some implementations, it may be advantageous to additionally specify the flowID in the MAC header or in the MAC payload. For example, if the same source and destination communicate via multiple flows, flowID may be useful. The flowID may then be unique among the flows within the TSN, which may provide for simpler implementation and configuration. Alternatively, the flow may be unique for the same source and destination.

A flow is a periodic data transmission from one end station of the TSN to another end station. The periodicity may be given by the network cycle.

What is claimed is:

1. A switch device for operating as an intermediate node in a Time Sensitive Network (TSN), the device comprising:
    a storage unit storing a configuration, indicating for a flow, a timing in which a frame pertaining to the flow is to be output;
    a processing circuitry configured to:
    receive a frame pertaining to the flow,
    determine whether the frame is a correct frame to be transmitted at a current time, including:
        determining whether the switch device is about to send a right frame according to a corresponding predefined or preconfigured schedule;
        in response to a to-be-sent frame being inconsistent with a predefined or preconfigured schedule, setting the switch device in idle instead of sending out the to-be-sent frame which is a different frame than intended; and
    transmit the frame at the current time, only in response to determining the frame being the correct frame to be transmitted at the current time according to the configuration.

2. The switch device according to claim 1, further comprising:
    one or more input ports, one or more output ports and one or more queues, wherein
    the processing circuitry is further configured to:
    store the frames being received by the one or more input ports into the one or more queues and transmit the frames via the one or more output ports according to the configuration.

3. The switch device according to claim 1, further comprising:
    an input for receiving the configuration to be stored in the storage unit from a Central Network Configuration (CNC) device.

4. The switch device according to claim 1, wherein the processing circuitry is further configured to:
    receive a frame for which no timing is indicated in the configuration; and
    transmit the frame at a time where no frame specified in the configuration is to be transmitted according to the configuration.

5. A control device for scheduling a transmission of a flow from a source to a destination via one or more intermediate nodes in a Time Sensitive Network (TSN), the one or more intermediate nodes including a subset of intermediate nodes, wherein the device comprises:
    one or more processors; and
    a non-transitory computer-readable memory storing a program which is executed by the one or more processors to cause the device to:
    determine, for each intermediate node of the subset, a configuration indicating for the flow, a timing in which a frame pertaining to the flow is to be output from the intermediate node;
    output the configuration to the one or more intermediate nodes of the subset; and
    wherein before the fame is output from the intermediate node, it is determined whether the intermediate node is about to send a right frame according to a corresponding predefined or preconfigured schedule;
    in response to a to-be-sent frame being inconsistent with a predefined or preconfigured schedule, the to-be-sent frame which is a different frame than intended will not be sent by the intermediate node.

6. The control device according to claim 5,
    wherein configurations are determined for a plurality of flows and chosen such that the least number of queues is used.

7. The control device according to claim 6, wherein
    the configurations are chosen such that a plurality of frames are not stored to the same queue in an intermediate node, only in response to a situation where the plurality of frames are scheduled to be transmitted in an order other than the order according to which the plurality of frames are scheduled to be received by the intermediate node, and in response to a situation rather than the above situation, configurations are chosen such that the plurality of frames is stored to the same queue.

8. The control device according to claim 5, wherein the processing circuitry is further configured to:

receive flow information comprising the source address and the destination address and the timing for the flow, and determine the configuration based on the received flow information.

9. The switch device of claim 1, wherein
the configuration comprises flow information identifying the flow by a source address and a destination address of the flow or by a value of a flow identifier.

10. The switch device of claim 1, wherein
the configuration comprises information in which queue the frame is stored and/or information specifying over which output port the frame is to be transmitted.

11. The switch device of claim 1, wherein
the frame is a Medium Access Control (MAC) frame including a source address and a destination address of the flow in MAC frame header.

12. The switch device of claim 1, wherein
the flow is a periodic data transmission from one end station of the TSN to another end station.

13. A method for operating an intermediate node in a Time Sensitive Network (TSN), wherein the method is applied to a switch device and comprises:

storing, a configuration indicating for a flow a timing in which a frame pertaining to the flow is to be output;

receiving a frame pertaining to the flow;

determining whether the frame is a correct frame to be transmitted at a current time, including:

determining whether the switch device is about to send a right frame according to a corresponding predefined or preconfigured schedule;

in response to a to-be-sent frame being inconsistent with a predefined or preconfigured schedule, setting the switch device in idle instead of sending out the to-be-sent frame which is a different frame than intended; and transmitting the frame at the current time, only in response to determining the frame being the correct frame to be transmitted at the current time according to the configuration.

14. A method for scheduling a transmission of a flow from a source to a destination via one or more intermediate nodes in a Time Sensitive Network (TSN), the one or more intermediate nodes including a subset of intermediate nodes, wherein the method is applied to a control device and comprises:

determining, for each intermediate node of the subset, a configuration indicating for the flow a timing in which a frame pertaining to the flow is to be output from the intermediate node;

outputting the configuration to the one or more intermediate nodes of the subset; and wherein before the fame is output from the intermediate node, it is determined whether the intermediate node is about to send a right frame according to a corresponding predefined or preconfigured schedule;

in response to a to-be-sent frame being inconsistent with a predefined or preconfigured schedule, the to-be-sent frame which is a different frame than intended will not be sent by the intermediate node.

15. A non-transitory computer-readable medium storing a program code which causes a control device to perform the method of claim 14 when executed by the control device.

16. The method according to claim 13, further comprising:

storing the frames being received by one or more input ports into one or more queues and transmit the frames via the one or more output ports according to the configuration.

17. The method according to claim 13, further comprising:

receiving the configuration to be stored in the storage unit from a Central Network Configuration (CNC) device.

18. The method according to claim 13, further comprising:

receiving a frame for which no timing is indicated in the configuration; and transmitting the frame at a time where no frame specified in the configuration is to be transmitted according to the configuration.

19. The method according to claim 14,
wherein configurations are determined for a plurality of flows and chosen such that the least number of queues is used.

20. The method according to claim 14, wherein
the configurations are chosen such that a plurality of frames are not stored to the same queue in an intermediate node, only in response to a situation where the plurality of frames are scheduled to be transmitted in an order other than the order according to which the plurality of frames are scheduled to be received by the intermediate node, and in response to a situation rather than the above situation, configurations are chosen such that the plurality of frames is stored to the same queue.

* * * * *